United States Patent
Sharma

(10) Patent No.: US 11,514,152 B2
(45) Date of Patent: Nov. 29, 2022

(54) SECURE CIPHERED APPLICATION LOGIN METHOD

(71) Applicant: Gaurav Sharma, New Delhi (IN)

(72) Inventor: Gaurav Sharma, New Delhi (IN)

( * ) Notice: Subject to any disclaimer, the term of this patent is extended or adjusted under 35 U.S.C. 154(b) by 288 days.

(21) Appl. No.: 16/612,736

(22) PCT Filed: May 11, 2018

(86) PCT No.: PCT/IB2018/053286
§ 371 (c)(1),
(2) Date: Nov. 11, 2019

(87) PCT Pub. No.: WO2018/207139
PCT Pub. Date: Nov. 15, 2018

(65) Prior Publication Data
US 2020/0065475 A1 Feb. 27, 2020

(30) Foreign Application Priority Data

May 11, 2017 (IN) .............................. 201711016640

(51) Int. Cl.
| | | |
|---|---|---|
| *G06F 21/36* | (2013.01) | |
| *H04L 29/06* | (2006.01) | |
| *G06F 21/45* | (2013.01) | |
| *H04L 9/32* | (2006.01) | |
| *H04L 9/40* | (2022.01) | |

(52) U.S. Cl.
CPC .............. *G06F 21/45* (2013.01); *G06F 21/36* (2013.01); *H04L 9/3226* (2013.01); *H04L 63/083* (2013.01)

(58) Field of Classification Search
CPC ....... G06F 21/45; G06F 21/36; H04L 9/3226; H04L 63/083
See application file for complete search history.

(56) References Cited

U.S. PATENT DOCUMENTS

| | | | |
|---|---|---|---|
| 7,908,645 B2 | 3/2011 | Varghese et al. | |
| 10,440,007 B1* | 10/2019 | Ramalingam | G06F 3/0484 |
| 2006/0097987 A1* | 5/2006 | Hughes | G06F 3/03543 |
| | | | 345/156 |
| 2008/0172382 A1* | 7/2008 | Prettejohn | H04L 63/126 |
| 2013/0263240 A1* | 10/2013 | Moskovitch | H04L 63/083 |
| | | | 726/7 |
| 2014/0053098 A1* | 2/2014 | Leyon | G06F 21/31 |
| | | | 715/780 |
| 2014/0173450 A1* | 6/2014 | Akula | G06F 21/6245 |
| | | | 715/741 |
| 2015/0207791 A1* | 7/2015 | Johnson | H04L 63/083 |
| | | | 713/185 |

OTHER PUBLICATIONS

International search report for priority application PCT/IB2018/053286, dated Aug. 21, 2018.
ISA Written Opinion for priority application PCT/IB2018/053286, dated Aug. 21, 2018.
https://docs.microsoft.com/en-us/windows/security/threat-protection/security-policy-settings/interactive-logon-dont-display-username-at-sign-in (Apr. 19, 2017).

* cited by examiner

*Primary Examiner* — Nelson S. Giddins
(74) *Attorney, Agent, or Firm* — Heslin Rothenberg Farley & Mesiti P.C.

(57) ABSTRACT

A computer-implemented method for allowing access to an application includes program code executing on a processor (s) receiving a username and a password as input from a user, in respective fields on a login screen. The program code generates a respective ciphered text corresponding to each of the received username and the received password. The program code displays the respective ciphered text as—a modified onscreen output on the login screen, alongside the respective entered username and password which are shown in an unreadable form on the login screen. The program code provides viewing controls to the user. The program code verifies the user based on the respective ciphered text displayed as the modified output on the login screen.

5 Claims, 5 Drawing Sheets

PRIOR ART

SECURE CIPHERED APPLICATION LOGIN METHOD

UltraSafe endeavors to highlight this glaring gap and has devised innovative functional and technical methods to plug this gap. Sole objective of UltraSafe is to begin security from the very first step, i.e. the login screen by modifying the 'username' in innovative ways that become impossible for a bystander to see and understand or to significantly increase the difficulty level for guessing it correct.

UltraSafe stealth attribute is need based and can be accessed or removed depending on user preference, especially in public places. Let's view it as a large gathering of people for any purpose, may be working together a well, but not shouting or publicizing names (their names), but only when needed.

FIELD OF INVENTION

UltraSafe is an inventive step in field of Cyber Security wherein the 'username' is accorded stealth or similar protection while being entered in the 'username' field of a login screen.

UltraSafe is an inventive step in field of Cyber Security wherein even the 'password' is accorded stealth or protection similar to the Username field as described in detail, without any compromise on functionality or deterioration of desired services or results.

It is well known that basic and primary method of restricting access to a system is through a set of 'username' and password, wherein a password may be common for multiple users, but the 'username' is designed to be unique. Uniqueness of 'username' is diligently checked prior to even allocation, clearly highlighting importance of its purpose.

UltraSafe transforms the entry of 'username' in 'username' field in innovative ways to make it impossible for any bystander to read or decipher. Drawing from the perfect analogy of 'Lock and Key', the inventive step in UltraSafe is to hide the lock itself in a way that an attacker sees place for a lock but never be able to identify any of its aspects.

UltraSafe and all its variants do not compromise on user convenience and user is able to switch off the stealth/scramble feature or see the real values being entered.

BACKGROUND OF INVENTION WITH REGARD TO DRAWBACKS ASSOCIATED WITH KNOWN ART

A set of lock and key symbolizes basic, visible security. In digital world, a 'set' of 'username' (u/n) and password (pwd) deliver similar result. Akin to a key, passwords are designed to be kept secret and akin to a lock, 'username' continues to lie in the open—currently.

In real and physical world, thieves and burglars target the lock first—not the Key. They will work to break the lock altogether or generate a key that opens the lock. Even in virtual and digital world, a cyber thief would target a known 'username' and then work to generate its corresponding key to enter the "username'—password' restricted area.

On one hand, the lock or 'username' gives a feeling of secure access, on the other hand it raises curiosity, intrigue and fascination on what is being protected, prompting a possible attempt to break-in.

This holds true even for those who, with no intention or purpose of a theft/intrusion, wish to declare an achievement, show an expertise or expose a vulnerability.

Even with security paraphernalia like fencing or manually guarding a premise, thieves strike. Similarly, even with additional security paraphernalia like firewalls, SSL, encryption etc., cyberthieves strike and gain entry through compromised "username's—password'.

To further add to misery, a convenience feature—Auto-Fill, allows previously filled data to be not just retained, but is clearly visible at the click of mouse button or as and when you start entering anything in requisite place.

Even by using the popular virtual keyboard that shuffles alphabets randomly, there isn't an increase in security levels. One may be able to secure (to some extent), keypresses from data intercepting spyware, but is of no use against prying eyes. Shoulder surfing/surveillance is often the first step of cybercriminals against a potential victim. Target is not the person per se, but the 'username'.

Ironically, in digital world, even cutting—edge technologies for security measures like firewalls, SSLs, DSCs, Tokens etc. have a human being as a user/administrator. And, to configure any of these measures, it all starts with a 'username'.

So, the 'Lock' is out in the open and for anyone to pick on—physical lock or 'username'. Such digital footprints are fully ignored fearing user restrictions or inconvenience.

By ensuring that 'username' gets accorded seriousness and secretiveness of levels similar to passwords, a significant number of attacks or potential attacks can thus be reduced.

Yet, no amount of security (physical or digital) is ever enough. It is a continuous marathon tussle between defenders and attackers. Prudence demands to continuously provide/upgrade cybersecurity measures and always be a leap ahead of attackers—before they catch up again. The loser obviously loses a lot more than just valuables.

OBJECT OF INVENTION

The object of UltraSafe Login invention is the humble 'username' which is always visible to anyone and everyone and becomes a starting point for hacking, but security around the same is completely ignored. A simple account when hacked, opens possibilities of serious damage at a later stage. Hence, to increase security, accounts being used need to be secured further and UltraSafe aims to exactly achieve it through innovative methods without compromising on user convenience.

Forensics often point out that accounts get compromised due to password (s) becoming known (by any means), actually, it is a 'set' of 'username' and password and not just passwords. Security aspects are continuously focused on passwords, which are mere keys to the lock. Endeavor is thus to equally secure the 'username', rather than just password.

UltraSafe Login is also particularly useful for Remote Administration Consoles, wherein a user logs in to the console of a remote machine, accesses a restricted area/application secured by a 'username' and password, but is completely oblivious of any watchful eyes.

Object of UltraSafe Login invention is also to accord similar level of security (as being discussed in detail for the username field) for the 'password' field as well, bringing both at par and exponentially increasing the difficulty level for hackers/crackers/attackers.

STATEMENT OF INVENTION

UltraSafe Login is transforming the onscreen 'username' in a way making it impossible for a bystander to read or understand, thereby significantly decreasing possibilities of account hacking, at the same time not compromising on user convenience.

UltraSafe Login is also the transformation of the password field by bringing both username and password fields at par in terms of security defined for either.

SUMMARY OF INVENTION

The inventive step allows users themselves, or service providers to choose one of the methods of letting their users, enter their 'username' in a manner that makes it meaningless to any bystander. At the same time, the said 'username' could be viewed in 'normal' mode as if the chosen security feature (s) weren't applied when the user hovers a mouse over the 'username' field or by clicking on the view button given alongside the UltraSafe 'username' field.

The said 'username' transformation may be based on one or more attributes like language, stealth, obscure, garble, rearrangement etc. and is easily reconverted into the mode understood by the user as shown in the examples in detailed description.

DESCRIPTION OF DRAWINGS

A typical login screen is shown in FIG. 1.

DETAILED DESCRIPTION

Figure 1:

It is well known that numerous IT applications (hereafter referred as 'Application' and referring to any technology-based interface, accessed on IT devices like computers, servers, mobile devices etc. or through a web browser for websites or as a local installation or a remote installation etc.) deploy numerous security safeguards to ensure authorized access.

The most common method is to allow access through a 'Login' Screen, wherein users enter a 'username' and a 'Password'. It is assumed that password would be kept secured/secret/safeguarded by the holder/provider/manager etc., of the said 'username'.

Such 'username' and 'Password' are entered/typed/echoed on this 'Login' screen in text boxes or when prompted to enter a secured area/resume a locked out session/ad-hoc user validation check etc.

Both 'username' and Password are required to get matched against corresponding entries as stored in database. Incorrectness in any or mismatch between the 'username' & 'Password' as a singular set will result in a failed attempt to Login.

UltraSafe Login is a simple method wherein the 'username' field m a login screen reflects a modified onscreen output, based on the method chosen by the user and/or system configuration, post which it does not remain the readily readable 'username' entered by user.

UltraSafe Login also has an optional stealth mode, wherein the 'username' even if entered continues to be shown as blank/non-modifiable field/same color as the background to give an impression of no entries having been made In a few UltraSafe variants, the entries made by the user are displayed in a modified manner by using a cipher for each character entered by the user.

User can, if this option is so configured, optionally click on 'view' button, available next to UltraSafe 'username' field and view the entry made.

User can, if this option is so configured, optionally hover the mouse pointer over UltraSafe 'username' field and view the entry made.

If, user chooses to not to click on the view button or do a mouse pointer hover over the UltraSafe 'username' field, but is confident that the 'username' entry made is correct, clicks on login or similar button to proceed, the UltraSafe based system so configured would treat the entry without prejudice and modification and return the result as 'invalid 'username" if it was entered incorrectly or allow access if it was indeed entered correctly. This is based on assumption and premise that the corresponding password so entered was also correct and was not the cause of error/denied access.

Though, enhancing security of the username is being professed in this invention, particularly comparing username field security to existing security available for the password field, UltraSafe Login's objective is to secure the overall login process and the same can be achieved best only if both username and password fields have optimal UltraSafe login security. However, this is not a limiting factor and parity in security level is optional.

Giving below one of the forms (obfuscation) of the UltraSafe Login for clearer understanding::

A typical login screen is shown in FIG. 1.

FIG. 1: A General Login Screen

In a general login screen, password is usually obfuscated while 'username' is not.

Numerous methods are known to 'crack' passwords. With advancements in technology and a desire to unhide the hidden, numerous software are available to 'crack' passwords. Such actions allow unauthorized access once the said password is 'cracked'. Underlying problem with this method is that a password is mapped to the said 'username' and once password is identified, 'cracker' or attacker enters the known set of 'username' and password in designated location and gains access.

All this happens since the 'username' is known.

By hiding/obfuscating the 'username' as well, UltraSafe makes the task of hackers/crackers almost impossible, since the hackers/crackers now do not even know what to lock to break !.

To use an analogy of "username' and Password' as 'Lock and Key', 'UltraSafe Login' ensures that even the 'Lock' is also not known to anyone even if its 'Key' becomes known.

So, UltraSafe creates a conundrum for the hackers/crackers in terms of what to crack first and how . . . since the key cannot be created as the lock is not known and lock cannot be created even if key is known. So, effectively, the crackers do not know what to crack?

At the same time, 'UltraSafe Login' does not provide any inconvenience to the Users, since a bonafide or an authorized user would be aware of his/her 'username'. Thus, in a public place or place of work, Users can choose to hide their 'username' also from prying eyes.

In case, the User does feel the need to see the entered 'username', existing technologies of showing/viewing the obfuscated data is applied to the 'username' field also, ensuring the User to view/correct the entered 'username'.

Additionally, a convenient, simple to use 'UltraSafe Login' Toggle Switch is also provided that allows Users to switch off this voluntary feature. So, Users can switch off the 'UltraSafe Login' at home or in private areas where no one can see what is being entered.

Figure 2:
FIG. 2 depicts an UltraSafe Login Screen (Ultra.Safe is switched Off)

The following figures show the simple 'UltraSafe Login'.
FIG. 2 is An UltraSafe Login Screen (Ultra.Safe is switched Off)

Figure 3:
FIG. 3 depicts an UltraSafe Login Screen where 'username' when entered, can be seen easily, password is obfuscated Ultra.Safe is switched Off)

FIG. 3 shows that 'username' when entered, can be seen easily, password is obfuscated Ultra.Safe is switched Off)

Figure 4:
FIG. 4 depicts an UltraSafe Login Screen with view buttons appear for both. 'username and Password (UltraSafe is switched On)

In FIG. 4 View buttons appear for both. 'username and Password (UltraSafe is switched On)

Figure 5:
FIG. 5 depicts an UltraSafe Login Screen where 'username appears obfuscated, when entered (Ultra.Safe is switched)

In FIG. 5 'username appears obfuscated, when entered (Ultra.Safe is switched On)

Figure 6:
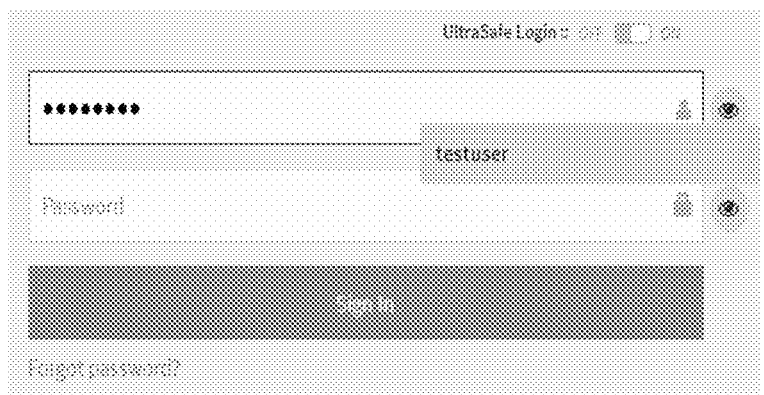
FIG. 6 depicts an UltraSafe Login Screen where a n obfuscated username can be seen only by clicking on the View Button (Ultra.Safe is switched On)

In FIG. 6 Obfuscated username can be seen only by clicking on the View Button (Ultra.Safe is switched On)

Figure 7:
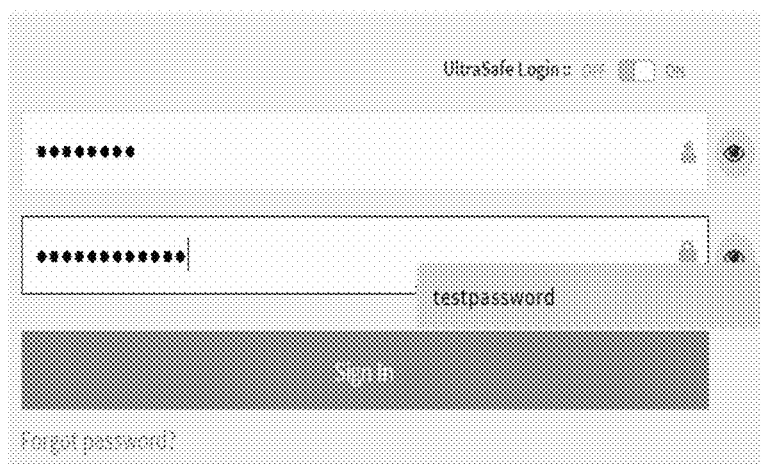
FIG. 7 depicts an UltraSafe Login Screen where Obfuscated Password can be seen only by clicking on the View Button (Ultra. Safe is switched On)

In FIG. 7 Obfuscated Password can be seen only by clicking on the View Button (Ultra. Safe is switched On).

Figure 8:
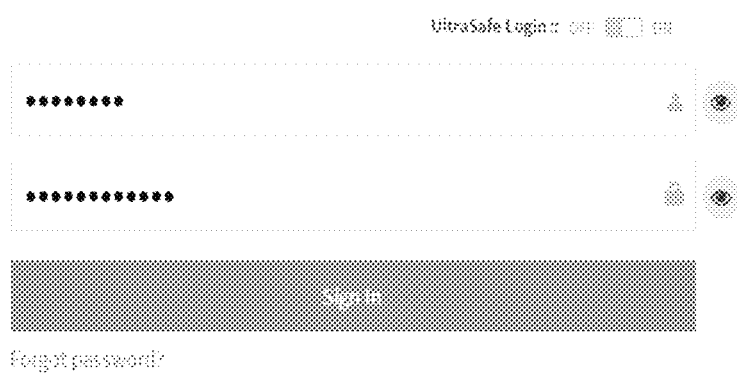
FIG. 8 depicts an UltraSafe Login Screen where Obfuscated 'username'/Password cannot be seen if not clicked on the view button (Ultra.Safe is switched On).

In FIG. 8 Obfuscated 'username'/Password cannot be seen if not clicked on the view button
(Ultra.Safe is switched On)

As can be clearly seen, the UltraSafe Login, without compromising on user convenience or desired functionality, not only completely secures the username, but also completely defines the privacy aspects as desired by every user.

An additional example of UltraSafe Login is using a smart cipher for Username and Password that could also be set by the users themselves.

To explain this simply, let's assume that a user has the following set of credentials for logging into a system::
Username::Gaurav
The configured cipher for this system converts this set as follows
::Username:: Ultra
Password:: Safe So, now whenever the said user would enter the username, "Gaurav", the smart cipher will convert it into "Ultra" and similarly, when the password is entered as "Sharma", the smart cipher displays the text as "Safe". It needs to be noted that simple English text has been used for explanation and UltraSafe Login is not limited to this alone and different ciphers could be deployed by users and system designers.

This would happen every time and each time, assuring the user that if such strings ae displayed, the entries made are correct and the so configured system shall allow requested access.

However, to an attacker this would seem to be a walk in the park, but any such misdemeanor would never get executed.

In a further enhancement, the users should be allowed to chose their own ciphering mechanism once they have logged in to a system, with or without UltraSafe, in a way that they can easily memorize the ciphered details. In such a case, once the user enters the actual username and password and clicks out of the designated field area, if the username and passwords entered are correct, the ciphered string would be displayed. If the ciphered string is not displayed/is incorrect, the user can undertake required corrections. Thus, even before clicking on the login/proceed button, the users get to know if the details entered by them are correct or not.

The most interesting aspect for this example is that once an attacker attempts to log on to the restricted access area, the available security apparatus can easily track the same. Thus, not only undesired intrusion is prevented or trapped at that point of time, necessary flagging could be undertaken to mark such prospective threat for future.

I claim:

1. A computer-implemented comprising:
receiving, by one or more processors, a username and a password as input from a user, in respective fields on a graphical user interface (GUI) comprising a login screen of an application;
generating, by the one or more processors, a respective ciphered text corresponding to each of the received username and the received password; and
displaying, by the one or more processors, the respective ciphered text as a modified onscreen output on the login screen, alongside the respective entered username and password which are shown in an unreadable form on the login screen;
providing, by the one or more processors, viewing controls to the user, accessible via the GUI, wherein the viewing controls comprise a given control, where based on utilizing the given control, the unreadable form of the username and the unreadable form of the password are made viewable on the login screen or are not viewable on the login screen;
verifying, by the one or more processors, the user is an authorized user of the application based on the respective ciphered text displayed as the modified output on the login screen, whether or not the unreadable form of the username or the unreadable of the password are viewable based on the user utilizing the given control.

2. The method of claim 1, wherein the viewing controls further comprises a stealth mode setting, wherein engaging the stealth mode displays the respective fields on the login screen as being empty upon entry of one or more of the username and the password.

3. The method of claim 1, wherein generating the respective ciphered text corresponding to each of the received username and the received password comprises using a cipher for each character entered by the user to generate the respective ciphered text.

4. The method of claim 1, wherein the viewing controls comprise an option to view the username and the password.

5. The method of claim 1, further comprising:
receiving input that does not match the respective ciphered text;
alerting a security administrator of a potential threat.

* * * * *